United States Patent [19]

Levrai et al.

[11] Patent Number: 5,005,914
[45] Date of Patent: Apr. 9, 1991

[54] DUAL BRAKE COMPENSATOR

[75] Inventors: Roland Levrai, Stains; Pascal Le Normand, Aulnay Sous Bois, both of France

[73] Assignee: Bendix France, Drancy, France

[21] Appl. No.: 407,481

[22] Filed: Sep. 14, 1989

[30] Foreign Application Priority Data

Sep. 30, 1988 [FR] France ................ 88 12861

[51] Int. Cl.$^5$ ............................. B60T 8/22
[52] U.S. Cl. .................... 303/9.63; 188/151 A; 303/9.75
[58] Field of Search ............ 303/9.63, 9.69, 9.75, 303/9.62, 9.73, 119; 188/151 A, 195

[56] References Cited

U.S. PATENT DOCUMENTS

| | | | |
|---|---|---|---|
| 3,278,240 | 10/1966 | Boyd | 303/9.75 |
| 4,101,176 | 7/1978 | Carre et al. | 303/9.63 |
| 4,114,145 | 9/1978 | Farr | 188/151 A |
| 4,203,627 | 5/1980 | Kono | 303/9.63 |

FOREIGN PATENT DOCUMENTS

| | | | |
|---|---|---|---|
| 522878 | 10/1953 | Belgium | 188/151 A |
| 2627166 | 12/1977 | Fed. Rep. of Germany . | |
| 2258992 | 8/1975 | France . | |
| 2067695 | 7/1981 | United Kingdom . | |
| 2070165 | 9/1981 | United Kingdom | 303/9.63 |

*Primary Examiner*—Matthew C. Graham
*Attorney, Agent, or Firm*—Larry J. Palguta; Ken C. Decker

[57] ABSTRACT

The invention relates to a dual brake compensator for a motor vehicle, comprising two correcting valves, of which the inlets are intended to be connected separately to two independent brake-pressure sources and the outlets to two independent brake motors, each correcting valve being capable of controlling the values of the pressures at its inlet and at its outlet according to a predetermined relation and comprising a piston subjected to elastic return means by an inlet member. According to the invention, the dual corrector includes a mechanism for comparing the positions of the inlet members of each correcting valve.

5 Claims, 2 Drawing Sheets

DUAL BRAKE COMPENSATOR

BACKGROUND OF THE INVENTION

The present invention relates to a dual compensation intended to be used in a dual hydraulic brake circuit of a motor vehicle.

Such compensators are used in motor vehicles, in order to make it possible to modulate the hydraulic pressure exerted on the rear-wheel brake motors as a function of the load on the rear axle. These compensators consist conventionally of a valve subjected to the action of a calibrated spring in order to protect the rear circuit from any increase of pressure above a predetermined value. The calibration of the spring is variable as a function of the load experienced by the rear undercarriage of the vehicle by means of a lever which is mounted pivotably on a pivot pin fastened to the compensator and the position of which represents the distance between a body element and an element of the rear undercarriage.

U.S. Pat. No. 4,101,176 makes known a dual brake corrector comprising, in a single housing, two correcting valves, of which the inlets are intended to be connected separately to two independent brake-pressure sources and the outlets to two independent sets of brake motors, each correcting valve being capable of controlling the values of pressures at its inlet and at its outlet according to a predetermined relation and comprising a piston subjected to elastic return means. In this dual corrector, a mechanical control is arranged between the pistons of the correcting valves and the elastic means, the inlet member of the mechanical control being subjected to the force generated by the elastic return means, while the outlet members interact separately with the pistons of the two correcting valves.

In the event of complete failure of one of the brake circuits associated with one of the correcting valves, the brake pressure is modified in the intact circuit in an adjustable way and can even be doubled. The failure of a circuit is thus overcome, enabling the driver of the vehicle to stop the latter, while this failure of a circuit is also signalled to the driver by a pressure-drop indicator of known type.

Such correctors thus act as safety systems in the event of a failure in a circuit, but it can happen that these correctors themselves fail and that this failure is not signalled to the driver. This will occur, for example, when the elastic return means is broken or relaxed, the inlet member of the mechanical control has seized, one of the shutters does not close or shows leaks, etc.

SUMMARY OF THE INVENTION

It is therefore an object of the present invention to provide a brake corrector with built-in failure detection, in order to signal to the vehicle driver, for example as a result of the lighting of an indicator lamp on the dashboard of, any impairment which may have arisen in the functioning of the brake corrector.

To achieve this, the invention provides a dual brake compensator for a motor vehicle, comprising two correcting valves, of which the inlets are intended to be connected separately to two independent brake-pressure sources and the outlets to two independent brake motors, each correcting valve being capable of controlling the values of the pressures at its inlet and at its outlet according to a predetermined relation and comprising a piston subjected to elastic return means by an inlet member, the dual corrector further including means for comparing the positions of the inlet members.

BRIEF DESCRIPTION OF THE DRAWINGS

The invention will now be described by way of example with reference to the accompanying drawings in which.

DETAILED DESCRIPTION OF THE INVENTION

Figure 1:
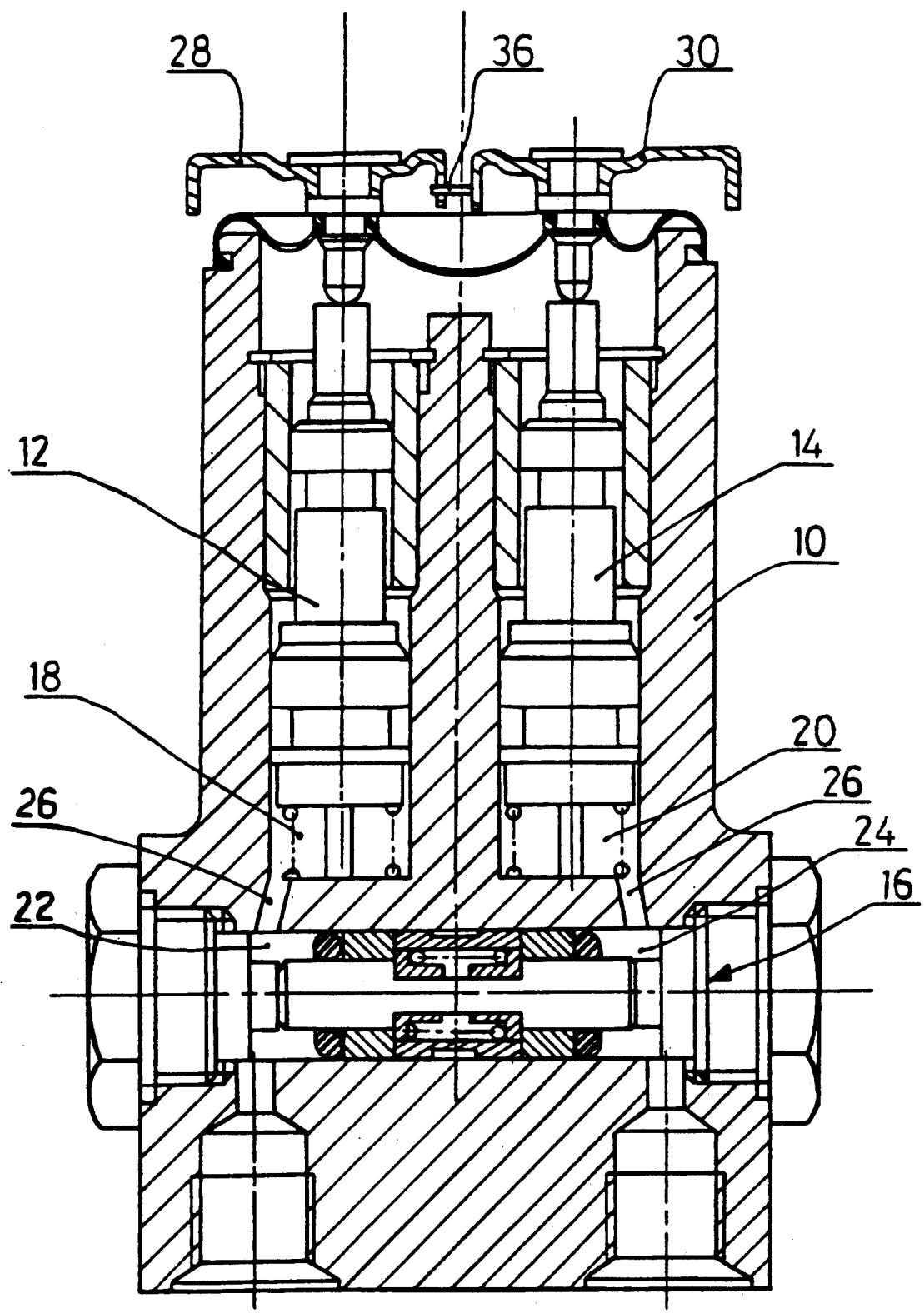
FIG. 1 is a sectional view of a dual brake corrector according to the invention.
Figure 3:
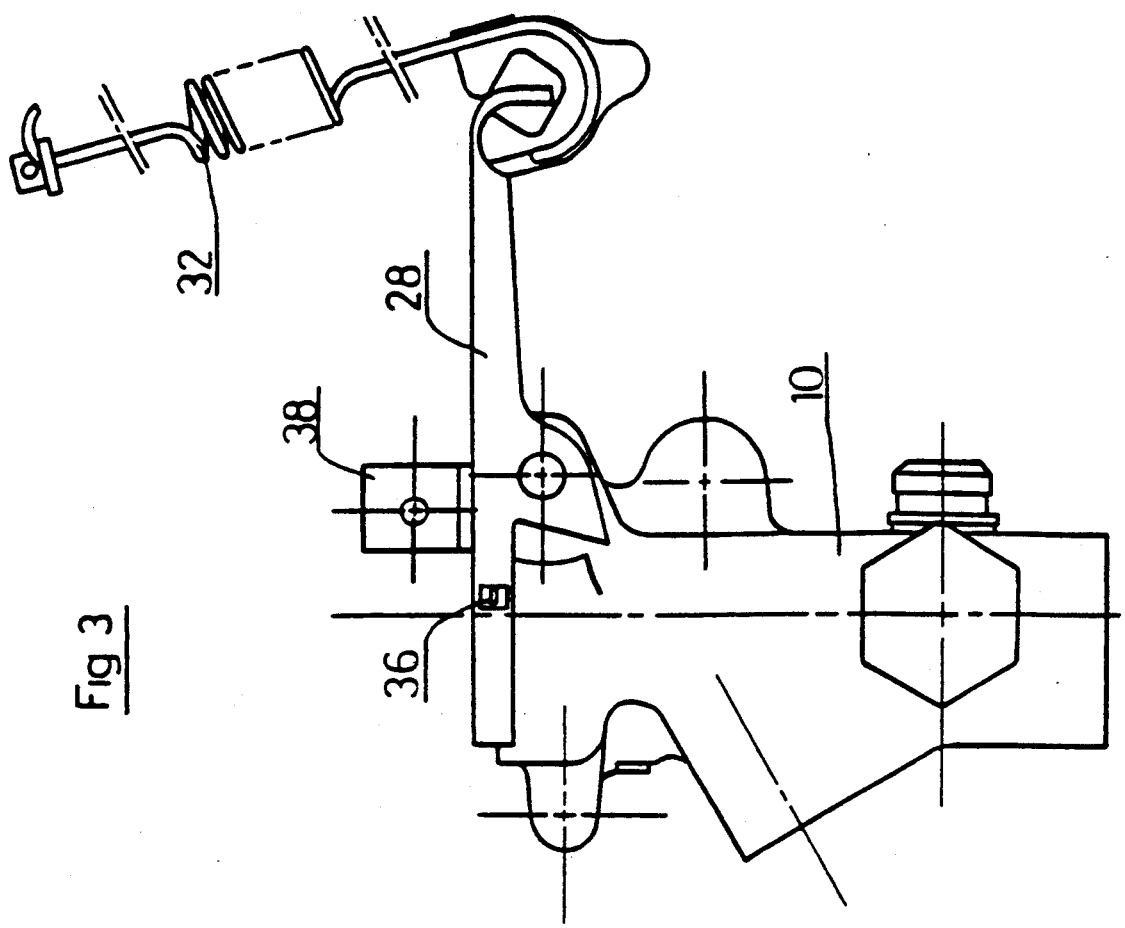
FIG. 3 is a side view of the same compensator.
Figure 2:
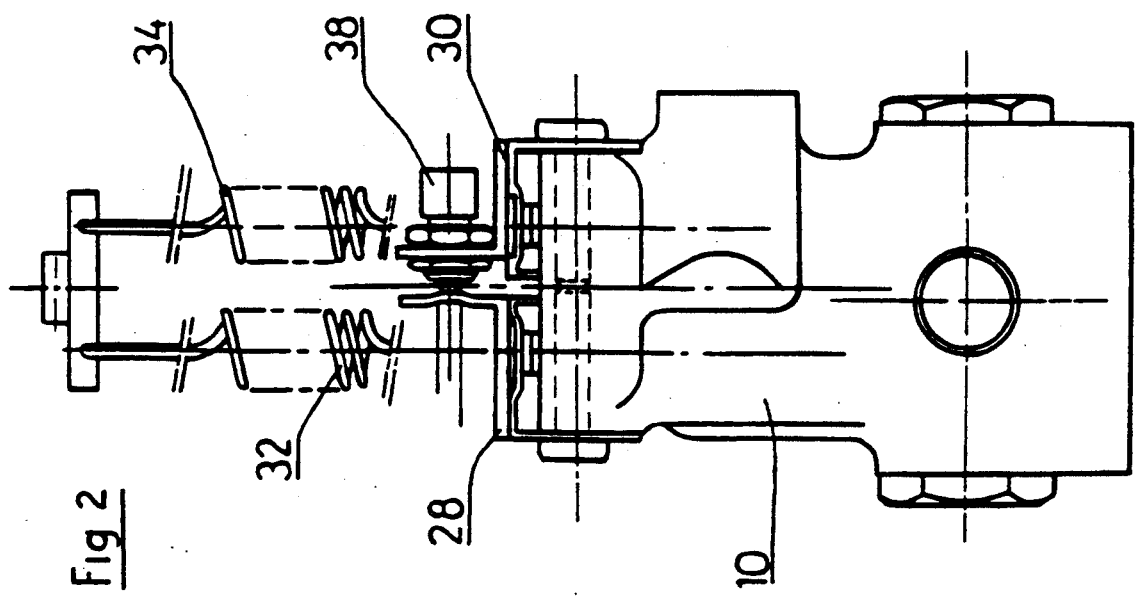
FIG. 2 is a front view of the compensator of FIG. 1.

FIG. 1 shows a dual compensator, as illustrated, for example, in the above mentioned document, and in which the means of the invention are put into effect in order to signal the failure of the compensator itself to the driver of the vehicle.

In the figures, the reference 10 denotes the housing of a dual brake compensator, in which two brake-correcting valves 12 and 14 are arranged. In a conventional assembly of the type in the above mentioned patent, the two correcting valves are controlled by a single mechanical control which acts on them as a function of the load on the rear axle.

In FIG. 1, dual brake compensator 10 includes a pressure failure warning device 16 which detects the failure of hydraulic functioning of compensator 10 by comparing the hydraulic pressures of the valves 12, 14 with one another. Device 16 is located adjacent outlet chambers 18 and 20 of correcting valves 12 and 14, respectively. A pressure difference between outlet chambers 18 and 20 causes a movement of device 16 toward the fluid circuit where the pressure is the lowest and can effect the making of an electrical contact, which can result in the lighting of an indicator lamp on the dashboard of the vehicle. In order to eliminate the possibility of rapid variations of pressure in either one of the hydraulic circuits effecting an undesirable warning signal which results in a false alarm, calibrated orifices or nozzles 26 are provided between outlet chambers 18 and 20 and the respective chambers 22 and 24 of device 16 in order to slow the transmission of such pressure variations to chambers 22 and 24. Thus, in the event of rapid pressure variations within the brake system, slight imbalances in the corresponding circuits will be filtered by means of the orifices or nozzles 26.

Likewise, according to the invention, the failure of the mechanical functioning of the dual compensator is detected and signalled to the vehicle driver. For this purpose, there is provision in the invention for equipping each of the correcting valves with its inlet member which is itself subjected to the action of its own elastic return means. Thus, the correcting valves 12 and 14 each have their own inlet member in the form of a control lever 28, 30, respectively, and no longer have a single control lever, as in the above mentioned U.S. Pat. No. 4,101,176. Each correcting valve 12, 14 is thus controlled by its own lever 28, 30, itself controlled by its own spring for connection to the suspension 32, 34 respectively.

In order to detect and signal the mechanical malfunctioning of the dual compensator, the invention provides a device for detecting the angular deviation between the two control levers. This device can consist, for example, of a microswitch 38 located on the pivot pin common to the two levers or in its vicinity. Such a microswitch of known type makes an electrical contact when the angle between the two levers is greater than a predetermined value of the order of a few degrees, thus indicating a mechanical failure of the compensator, for example the lighting of an indicator lamp on the dashboard.

It will thus be appreciated that small angular deviations between the levers which are customary in the normal functioning of the compensator will not be signalled, whereas the occurrence of a mechanical failure will be signalled immediately, even when it is only slight. If the failure worsens or is serious as soon as it occurs, it is desirable to increase the point of activation of the intact circuit and thereby raise the outlet pressure on this circuit. In this case, according to the invention, a finger 36 is arranged on either one of or on both of the levers, this finger penetrating into an oblong slot in the other lever, in order to limit the angular deflection of the levers relative to one another beyond a predetermined value and thus recover on the intact circuit the force of the spring for controlling the failed circuit.

It is clear that, for this detection system, it can be a locked-contact system, so that the indicator lamp on the dashboard remains lit once the first detection of failure has occurred.

We claim:

1. A dual brake compensator for a motor vehicle, comprising two correcting valve of which respective inlets are connected separately to two independent brake-pressure sources and respective outlets are connected separately to two independent brake motors, each correcting valve being capable of controlling the values of pressures at the respective inlet and outlet of the valve according to a predetermined relation, and each correcting valve comprising a piston subjected to respective elastic return means by a respective lever, the dual brake compensator further including a device for detecting and providing a warning signal of an angular deviation between the levers.

2. The dual brake compensator according to claim 1, wherein the device for detecting and providing a warning signal of an angular deviation between the levers is a microswitch.

3. The dual brake compensator according to claim 2, wherein the microswitch makes an electrical contact when an angle between the levers is greater than a predetermined value.

4. The dual brake compensator according to claim 2, wherein the microswitch is a locked-contact type microswitch.

5. The dual brake compensator according to claim 1, wherein at least one of the levers has a finger, said finger penetrating into an oblong slot in the other lever.

* * * * *